United States Patent [19]
Vaz et al.

[11] Patent Number: 4,971,719
[45] Date of Patent: Nov. 20, 1990

[54] POLYMER DISPERSED LIQUID CRYSTAL FILMS FORMED BY ELECTRON BEAM CURING

[75] Inventors: Nuno A. Vaz, West Bloomfield; George W. Smith, Birmingham, both of Mich.

[73] Assignee: General Motors Corporation, Detroit, Mich.

[21] Appl. No.: 411,178

[22] Filed: Sep. 22, 1989

[51] Int. Cl.⁵ .............................................. C09K 19/54
[52] U.S. Cl. ........................ 252/299.5; 252/299.01; 428/1; 350/331 R; 350/351; 350/347 V; 350/347 R; 427/54.1; 427/44
[58] Field of Search .................... 428/1; 128/736; 252/299.5, 299.66, 299.01; 350/331 R, 351, 347 V, 347 R; 427/54.1, 44

[56] References Cited

U.S. PATENT DOCUMENTS 4,008,341  2/1977  Kehr ..................................... 427/44
4,728,547  3/1988  Vaz et al. .............................. 428/1

FOREIGN PATENT DOCUMENTS 0272585  6/1988  European Pat. Off. .

Primary Examiner—John S. Maples
Assistant Examiner—Richard Treanor
Attorney, Agent, or Firm—Domenica N. S. Hartman

[57] ABSTRACT

Optically responsive films comprising birefringent nematic and/or birefringent chiral nematic liquid crystal microdroplets dispersed in electron beam cured polymeric reaction products are disclosed.

1 Claim, 1 Drawing Sheet

POLYMER DISPERSED LIQUID CRYSTAL FILMS FORMED BY ELECTRON BEAM CURING

This invention relates to optical films incorporating birefringent nematic and chiral nematic liquid crystal materials. More particularly, this invention relates to thin optically responsive films of electron beam cured polymers incorporating a dispersion of microdroplets of such liquid crystal materials.

BACKGROUND OF THE INVENTION

As liquid crystal devices find wider application, there is motivation to develop new and easier ways to make or use packages of these special materials. It is now known that some liquid crystal materials and certain liquid polymer precursors may be mixed together, the mixture formed into a film, and the polymer precursor materials allowed to react and cure. The resulting product is a polymer film that contains dispersed or encapsulated therein, many very small drops of liquid crystal material. Depending upon the nature of the liquid crystal material, the film may be opaque at room temperature. However, when that film is heated, stressed, or subjected to an electrical or magnetic field across its thickness, those portions of the film tend to become transparent.

Dispersion of liquid crystal material in a cured polymer matrix film is a convenient package for working with the liquid crystals. There have been several methods proposed for forming these films, including thermal cure, ultraviolet cure, phase separation by cooling a thermoplastic-polymer/liquid crystal mixture, and evaporation of solvent from a thermoplastic/liquid crystal solution. However, there are shortcomings associated with each of these known methods for forming these polymer-dispersed liquid crystal films.

Generally, when using a thermal cure such as with thermoset materials which cure by cross-linking, the polymer precursors must be handled in two parts to avoid premature curing. In addition, commonly used liquid crystal materials usually cannot tolerate high temperatures. Therefore, the polymer precursors must be chosen to be curable at about room temperature. Further, once all ingredients are mixed, the cure begins and the cure is relatively slow which leads to handling problems and aging problems in the polymer film.

The use of ultraviolet curing methods is also not ideal, since this method requires the addition of photoinitiators to the film. These photoinitiators may result in shortened film life unless special, non-trivial protective steps are taken.

Lastly, there are problems associated with the use of the thermoplastic-based films for producing the final film. The thermoplastic-based films and their physical characteristics such as refractive index, are extremely temperature sensitive since they are not cross-linked. In addition, high temperature usage of these thermoplastic films are limited because of undue softening and melting of the film. Lastly, because of the nature of the way these films are prepared, essentially by freezing or evaporation of a solvent, the resulting films are typically characterized by non-uniform thickness and properties.

Therefore, it is desirable to provide a method for curing these polymer films having the liquid crystal materials dispersed throughout. It is further desirable that such method avoid and alleviate the shortcomings associated with the previous methods.

SUMMARY OF THE INVENTION

It is an object of the present invention to provide a method for forming thin films of polymer-dispersed liquid crystal material utilizing specific electron beam curable polymeric precursor materials.

It is a further object of the present invention to provide a method for rapidly preparing an electron-beam cured polymer film of dispersed liquid crystal materials that may be formed between flat glass or plastic optical plates or upon another suitable substrate, which can be accomplished by premixing liquid materials, and later at a time of choice rapidly and substantially completely curing the films with electron beam irradiation at room temperature or other desired temperature to minimize handling problems as well as degradation or other side reactions with the dispersed liquid crystal material.

It is still a further object of this invention to provide a method for forming a polymer film containing droplets of suitable nematic or chiral nematic type liquid crystal materials such that the film is opaque in one mode of operation and transparent in another mode.

In accordance with a preferred embodiment of this invention, these and other objects and advantages are accomplished as follows.

An optically responsive polymer dispersed liquid crystal film using electron beam curing techniques is prepared. The film contains birefringent nematic and/or birefringent chiral nematic liquid crystal microdroplets dispersed in a film of an electron beam cured reaction product. The electron beam cured reaction product contains a mercaptan activated allyl compound, preferably triallyl isocyanurate and pentaerythritol tetrakis(2-mercapto-propanoate).

The liquid crystal microdroplets display positive dielectric anisotropy and/or positive diamagnetic anisotropy, thereby being capable of undergoing repeated thermally, electrically or magnetically induced transitions between opaque and transparent states.

Also comprehended by this invention is the method for making such a polymer dispersed liquid crystal film. First, the liquid crystal material, preferably birefringent nematic and/or birefringent chiral nematic liquid crystals, is mixed with the electron-beam curable liquid precursor mixture. The electron-beam curable liquid precursor mixture is a mercaptan activated allyl compound, preferably of the type described above. Then the mixture is cured in the form of a film with a focused electron beam to thereby form a cured polymer matrix having therein droplets of liquid crystal material displaying positive dielectric anisotropy and/or positive diamagnetic anisotropy.

Utilizing electron beam curing methods for forming polymer dispersed liquid crystal films has many advantages, such as a rapid cure, controlled cure processing parameters, and relatively temperature-incentive refractive index in the resultant film, while avoiding the shortcomings associated with the previous methods such as the use of a photoinitiator in the matrix material. Therefore, it is possible to use simpler matrix materials than were required for the previous curing methods.

Other objects and advantages of this invention will be better appreciated from a detailed description thereof, which follows.

BRIEF DESCRIPTION OF THE DRAWINGS

The above and other advantages of the invention will become more apparent from the following description taken in conjunction with the accompanying drawings wherein like references refer to like parts and wherein.

DETAILED DESCRIPTION OF THE INVENTION

Figure 1:
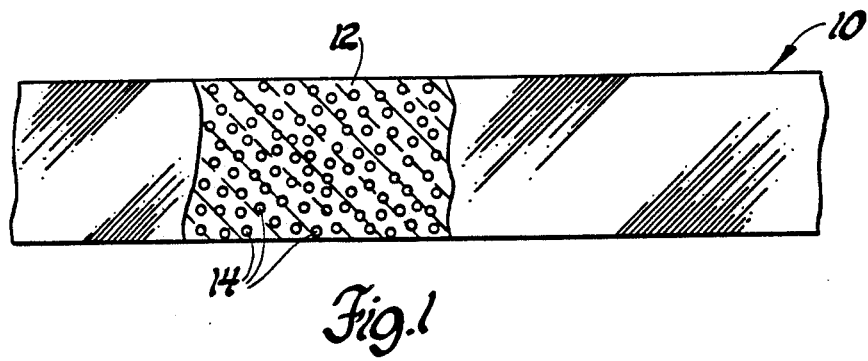
FIG. 1 is a schematic view in cross-section and greatly enlarged of a liquid crystal-containing film of this invention.

Utilizing our electron beam curing methods for forming polymer dispersed liquid crystal films has many advantages, such as a rapid cure, controlled cure processing parameters, and relatively temperature-insensitive refractive index in the resultant film. In addition, our curing method eliminates the shortcomings associated with other methods such as the use of a photoinitiator in the matrix material. Therefore, it is possible to use simpler matrix materials than were required for the previous curing methods.

Various combinations of the electron beam-curable polymer precursor matrix formulations, liquid crystal compositions, substrates and electron beam dosages were tried to determine the optimum combination.

Although only two types of substrates were utilized to fabricate the electron beam cured polymer dispersed liquid crystal films, four were evaluated for their propensity to discolor upon exposure to the electron beam irradiation. The four types of substrates tested for discoloration due to the electron beam irradiation were polyethylene terephthalate (polyester), glass, flexible glass and polycarbonate. The polyester (PET) was the only substrate which did not discolor significantly, whereas the others did. Only the polyester and flexible glass were used to actually form the electron beam cured polymer dispersed liquid crystal films. Because the polyester did not tend to discolor, coupled with the need for fully flexible substrates for large scale fabrication requirements, the polyester is the preferred substrate for use in these electron beam cured films.

Three different types of liquid crystal compositions were utilized. Generally, the three liquid crystal mixtures contained biphenyl, terphenyl, cyclohexyl, and/or pyrimidine compounds. More particularly, the three commercially available mixtures which were employed were E7 and E63 available from EM Industries, Hawthorne, N.Y., and ROTN404 available from Hoffman-LaRoche, Nutley, N.J.

The E7 liquid crystal mixture contains approximately:
- 51 weight percent of the commonly known liquid crystal component 5CB having the chemical name [1,1'Biphenyl],4-carbonitrile,4'-pentyl;
- 25 weight percent of the commonly known liquid crystal component 7CB having the chemical name [1,1'Biphenyl],4-carbonitrile,4'-heptyl;
- 16 weight percent of the commonly known liquid crystal component 8OCB having the chemical name [1,1'Biphenyl],4-carbonitrile,4'-octyloxy; and
- 8 weight percent of the commonly known liquid crystal component 5CT having the chemical name [1,1',4'-1"-Terphenyl],4-carbonitrile,4"pentyl.

The E63 liquid crystal mixture is similar to the E7 mixture with added cyclohexanes. It contains:
- significant amounts of the commonly known liquid crystal component 5CB having the chemical name [1,1'Biphenyl],4-carbonitrile,4'-pentyl;
- significant amounts of the commonly known liquid crystal component 7CB having the chemical name [1,1'Biphenyl],4-carbonitrile,4'-heptyl;
- lesser amounts of the commonly known liquid crystal component 5CT having the chemical name [1,1',4'-1"-Terphenyl],4-carbonitrile,4"pentyl;
- lesser amounts of the commonly known liquid crystal component PCH3 having the chemical name Benzonitrile,4-(4 propyl-1-cyclohexen-1-yl);
- lesser amounts of the commonly known liquid crystal component BCH5 having the chemical name [1,1'Biphenyl]-4-carbonitrile,4'(4-pentyl-1-cyclohexen-1-yl); and
- still lesser amounts of the commonly known liquid crystal component DB71 having the chemical name [1,1'-Biphenyl]-4-carboxylic acid, 4'-heptyl-4'-cyano[1,1'-biphenyl]-4-yl ester.

The ROTN404 liquid crystal mixture is also similar to the E7 mixture with added pyrimidines. It contains approximately:
- 30 weight percent of the commonly known liquid crystal component 50CB having the chemical name [1,1'Biphenyl],4-carbonitrile,4'-pentyloxy;
- 15 weight percent of the commonly known liquid crystal component 80CB having the chemical name [1,1'Biphenyl],4-carbonitrile,4'-octyloxy;
- 10 weight percent of the commonly known liquid crystal component 5CT having the chemical name [1,1',4'-1"-Terphenyl],4-carbonitrile,4"pentyl;
- 10 weight percent of the commonly known liquid crystal component RO-CP-7035 having the chemical name Benzonitrile,4-(5-pentyl-2-pyrimidimyl)-;
- 20 weight percent of the commonly known liquid crystal component RO-CP-7037 having the chemical name Benzonitrile,4-(5-heptyl-2-pyrimidimyl)-; and
- 15 weight percent of the commonly known liquid crystal component RO-CM-7334 having the chemical name Benzonitrile,4-[5-(4-butylphenyl)-2-pyrimidinyl].

Four different electron beam-curable polymer precursor matrix formulations were tested. The four formulations contained various combinations of six different individual polymer components. The six individual polymer components are as follows.

NOA65, which is commercially available as Norland Optical Adhesive from Norland Products, New Brunswick, N.J. contains approximately 56 percent triallyl isocyanurate, approximately 41 percent pentaerythritol, tetrakis(2-mercapto-propanoate) and approximately 4 percent benzophenone.

NUVOPOL EMBO is a photoaccelerator commercially available from Aceto Chemical Co., Inc., Flushing, NY. Qualitatively, it contains 4-dimethylamino benzoic acid, ethyl ester.

PHOTOMER 5007 is a diacrylate oligomer commercially available from Diamond Shamrock, Morristown, N.J.

PHOTOMER 6008 is a diurethane diacrylate commercially available from Diamond Shamrock, Morristown, N.J.

DUDMA is single component diurethane dimethacrylate commercially available from Polysciences, Inc., Washington, Pa.

PETA is single component pentaerythritol tetraacrylate commercially available from Polysciences, Inc., Washington, Pa.

The four polymer matrix formulations incorporating the various combinations of these six individual polymers utilized to form the electron beam-curable polymer precursor are as follows.

Formulation A is a mixture of the NOA65 polymer plus approximately 2 volume percent NUVOPOL. This formulation is a mercaptan-activated allyl system.

Formulation B is a mixture of approximately two volume parts P5007 polymer with approximately 1 volume part PETA. Formulation B is an acrylate.

Formulation C is a mixture of approximately two volume parts P6008 polymer with approximately 1 volume part PETA. Formulation C is an acrylate.

Formulation D is a mixture of approximately two volume parts DUDMA polymer with approximately 1 volume part PETA. Formulation D is a methacrylate.

The electron beam curing process is produced by breaking the monomer bonds within the polymer matrix formulation by the energetic electrons. The cure times required are a function of the organic system employed, with acrylates requiring less cure time than the methacrylates, which require less cure time the allyls. All four electron beam-curable polymer precursor formulations were electron beam cured with different combinations of the liquid crystal compositions and substrates, with varying degrees of success achieved.

FIG. 1 illustrates a film 10 of the electron beam cured polymer matrix 12 having microdroplets 14 of liquid crystal material therein.

Figure 2:
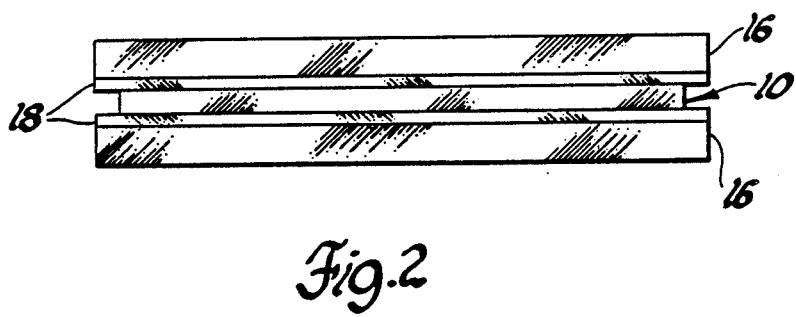
FIG. 2 is a schematic view in enlarged cross section of the film disposed between two transparent plates.

FIG. 2 illustrates the film 10 of FIG. 1 sandwiched between two transparent substrates 16. A transparent conductive coating 18, preferably indium-tin oxide, however, other materials such as tin oxide, gold or silver may also be used, is provided between the electron beam cured film 10 and each transparent substrate 16, so as to contact the electron beam cured film 10.

The electron accelerator utilized was an Electrocurtain Model P250S processor with Selfshield web handling assembly available from Energy Sciences, Inc., Woburn, MA. The electron accelerator was operated at approximately 250 kiloVolts. Sample dosages in the range from approximately 5 to 20 Megarads were obtained by varying the electron beam current from approximately 2 to 10 milliAmps. To determine the optimum electron irradiation dosages it was necessary to correct for electron energy loss in the top substrate 16 of the sandwiched structure shown in FIG. 2. Further, the dosages are dependent on the density of the electron beam cured polymer dispersed liquid crystal film 10. At 250 kiloVolts operating voltage, the penetration depth was approximately 12 mils at which the dosage was 50 percent of the maximum. The unregulated cure temperature was approximately 50° C., which was the temperature of the baseplate. The film samples were exposed to the electron dosage by means of a conveyor belt moving at approximately 10 feet/minute.

The preferred combination of substrate material, liquid crystal material, electron beam curable polymer precursor matrix formulation and electron beam dosages is as follows. One volume part formulation A electron beam curable polymer precursor matrix to one volume part ROTN404 liquid crystal material is premixed and may be allowed to stand theoretically indefinitely before exposure to the electron beam irradiation; however, in practice one would want to limit the amount of time before curing so as to avoid any detrimental aging effects. The mixture is then sandwiched between two PET substrates. A suitable transparent conductive coating is provided between the substrates and intermediate mixture of polymer precursor matrix and liquid crystal material. The sandwiched structure was exposed to an optimum electron dosage of approximately 10 Megarads. The thickness of the polymer-dispersed liquid crystal film is approximately 41 microns nominally. The liquid crystal droplets were determined by Scanning electron microscopy to have a nominal diameter of approximately 0.7 microns.

The resulting films were characterized by being milky white opaque at room temperature. However, when the films were heated to the nematic-isotropic phase transition temperature of the liquid crystal material of approximately 80° C., they abruptly became clear and transparent. Our films remained clear at temperatures above about 80° C., but returned to a milky opaque condition when cooled below that temperature.

The transparent conductive electrodes were connected to an electrical source and had applied 100 volts, 60 cycle AC. This electrical stimulation resulted in the opaque film becoming clear and transparent. When the voltage was removed, the films again virtually instantaneously became opaque. Further, when the films are subjected to applied mechanical stress, they also exhibit this change between opaque and transparency to varying degrees. Notably, the transparent state was capable of polarizing the incident light in the direction of polarization perpendicular to the stress direction.

Other combinations of the liquid crystal materials, electron beam curable polymer precursor matrix, substrate and electron beam dosages were tried with the resulting optical properties ranging from fair to good. Those combinations were as follows.

Example 2: Approximately one volume part ROTN404 liquid crystal material mixed with approximately one volume part Formulation A polymer precursor. The mixture was sandwiched between transparent polyester substrates. An electron dosage of approximately 20 Megarads was utilized. The resulting sandwiched structure had a film thickness of approximately 48 microns. In the off state, the film exhibited very good light scattering properties. Further, it was characterized by good thermo-optic response and stress induced optic response, but poor electro-optic response.

Example 3: Approximately 0.75 volume part ROTN404 liquid crystal material mixed with approximately one volume part Formulation A polymer precursor. The mixture was sandwiched between polyester substrates. An electron dosage of approximately 20 Megarads was utilized. In the off state, the film exhibited fair light scattering properties.

Example 4: Approximately one volume part ROTN404 liquid crystal material mixed with approximately one volume part Formulation B polymer precursor. The mixture was sandwiched between polyester substrates. An electron dosage of approximately 5 Megarads was utilized. The resulting sandwiched structure had a film thickness of approximately 64 microns. In the off state, the film exhibited good light scattering properties. It was characterized by poor electro-optic response and good thermo-optic response. The films were too rigid to measure an optic response to induced stress. It is believed that the film was not completely cured due to the excessive thickness of the film. It is believed that if the thickness were reduced, the stress-induced optic response would improve.

Example 5: Approximately one volume part ROTN404 liquid crystal material mixed with approximately one volume part Formulation B polymer precursor. The mixture was sandwiched between polyester substrates. An electron dosage of approximately 10 Megarads was utilized. The resulting sandwiched structure had a film thickness of approximately 77 microns. In the off state, the film exhibited very good light scattering properties. It was characterized by poor electro-optic response, good thermo-optic response and again was too rigid due to excessive thickness of the film to optically respond to applied stress.

Example 6: Approximately one volume part ROTN404 liquid crystal material mixed with approximately one volume part Formulation B polymer precursor. The mixture was sandwiched between polyester substrates. An electron dosage of approximately 20 Megarads was utilized. The resulting sandwiched structure had a film thickness of approximately 74 microns. In the off state, the film exhibited very good light scattering properties. It was characterized by poor electro-optic and thermo-optic responses probably due to the large film thicknesses or rigidity. The stress-induced optic response was also poor due to, it is believed, the excessive thicknesses.

Example 7: Approximately one volume part E63 liquid crystal material mixed with approximately one volume part Formulation D polymer precursor. The mixture was sandwiched between polyester substrates. An electron dosage of approximately 10 Megarads was utilized. In the off state, the film exhibited good light scattering properties. It was characterized by fair electro-optic response and good thermo-optic response.

Example 8: Approximately one volume part E63 liquid crystal material mixed with approximately one volume part Formulation D polymer precursor. The mixture was sandwiched between polyester substrates. An electron dosage of approximately 20 Megarads was utilized. In the off state, the film exhibited very good light scattering properties. It was characterized by fair electro-optic response and good thermo-optic response.

Example 9: Approximately one volume part ROTN404 liquid crystal material mixed with approximately one volume part Formulation C polymer precursor. The mixture was sandwiched between flexible glass substrates. An electron dosage of approximately 6.25 Megarads was utilized. In the off state, the film exhibited fair light scattering properties. It was characterized by poor thermo-optic response and again was too rigid to determine an optic response to applied stress.

Example 10: Approximately one volume part E7 liquid crystal material mixed with approximately one volume part Formulation B polymer precursor. The mixture was sandwiched between flexible glass substrates. An electron dosage of approximately 12.5 Megarads was utilized. In the off state, the film exhibited good light scattering properties, and was characterized by poor thermo-optic response and rigid optic response to applied stress.

Therefore, the electron beam cured polymer-dispersed liquid crystal films exhibit great utility, yet are formed without the disadvantages associated with the previous methods for forming these films. The films are opaque at room temperature but are readily converted to a transparent film by the application of heat, a suitable electrical potential or applied stress. Clearly by adjusting the indices of refraction of the polymer and the liquid crystal via dissolving suitable materials, or by optimizing the film thickness, one can optimize the temperature driven effects or the electric or magnetic driven effects. In addition, one skilled in the art may choose to use our electron beam curing method with liquid crystals having a smectic molecular structure, or use further techniques to achieve memory effects in the films, or alternatively, one may choose to use our method of electron-beam treatment for treatment of polymer dispersed liquid crystal films which have been prepared by other techniques for enhancement of their properties, such as reduced temperature sensitivity of the refractive index. The films may be formed easily and rapidly with our method, even in large area configurations. Obviously such a film could be adapted as a display, a light shutter or a temperature sensing device.

While our invention has been described in terms of a few specific examples, it will be appreciated that other forms could readily be adapted by one skilled in the art. Accordingly, the scope of our invention is to be considered limited only by the following claims.

The embodiments of the invention in which an exclusive property or privilege is claimed are defined as follows:

1. A film comprising:
   birefringent nematic and/or birefringent chiral nematic liquid crystal microdroplets dispersed in a film of an electron beam cured reaction product;
   said electron beam cured reaction product comprising triallyl/isocyanurate and pentaerythritol tetrakis(2-mercapto propanoate) and excluding any photoinitiator;
   said microdroplets displaying positive dielectric anisotropy and/or positive diamagnetic anisotropy;
   said film being capable of undergoing repeated thermally and electrically or magnetically induced transitions between opaque and transparent.

* * * * *